United States Patent [19]

Glicksman et al.

[11] 4,269,796
[45] May 26, 1981

[54] WET/DRY COOLING TOWER AND METHOD

[75] Inventors: Leon R. Glicksman, Lynnfield; Warren R. Rohsenow, Waban, both of Mass.

[73] Assignee: Massachusetts Institute of Technology, Cambridge, Mass.

[21] Appl. No.: 714,557

[22] Filed: Aug. 16, 1976

[51] Int. Cl.² .............................................. B01F 3/04
[52] U.S. Cl. ........................ 261/112; 165/DIG. 1; 261/151; 261/153; 261/161; 261/DIG. 11; 261/DIG. 77
[58] Field of Search .............................. 261/110–112, 261/158–161, 94, 97, DIG. 11, DIG. 77, 153, 155, 156; 165/166, DIG. 1, 60

[56] References Cited

U.S. PATENT DOCUMENTS

| 829,700 | 8/1906 | Drees | 261/111 |
|---|---|---|---|
| 2,206,440 | 7/1940 | Walker | 261/112 |
| 2,490,079 | 12/1949 | Melvill | 261/94 |
| 2,809,818 | 10/1957 | Munters | 261/112 X |
| 2,885,195 | 5/1959 | Haselden | 261/112 |
| 3,281,307 | 10/1966 | Moeller et al. | 261/112 X |
| 3,403,531 | 10/1968 | Oesterheld | 261/DIG. 11 |
| 3,440,803 | 4/1969 | Wechselblatt | 261/112 X |
| 3,525,391 | 8/1970 | Day | 261/112 X |
| 3,599,943 | 8/1971 | Munters | 261/112 X |
| 3,994,999 | 11/1976 | Phelps | 261/112 X |

*Primary Examiner*—Richard L. Chiesa
*Attorney, Agent, or Firm*—Arthur A. Smith, Jr.

[57] ABSTRACT

A wet/dry cooling tower wherein a liquid to-be-cooled is flowed along channels of a corrugated open surface or the like, which surface is swept by cooling air. The amount of the surface covered by the liquid is kept small compared to the dry part thereof so that said dry part acts as a fin for the wet part for heat dissipation.

11 Claims, 6 Drawing Figures

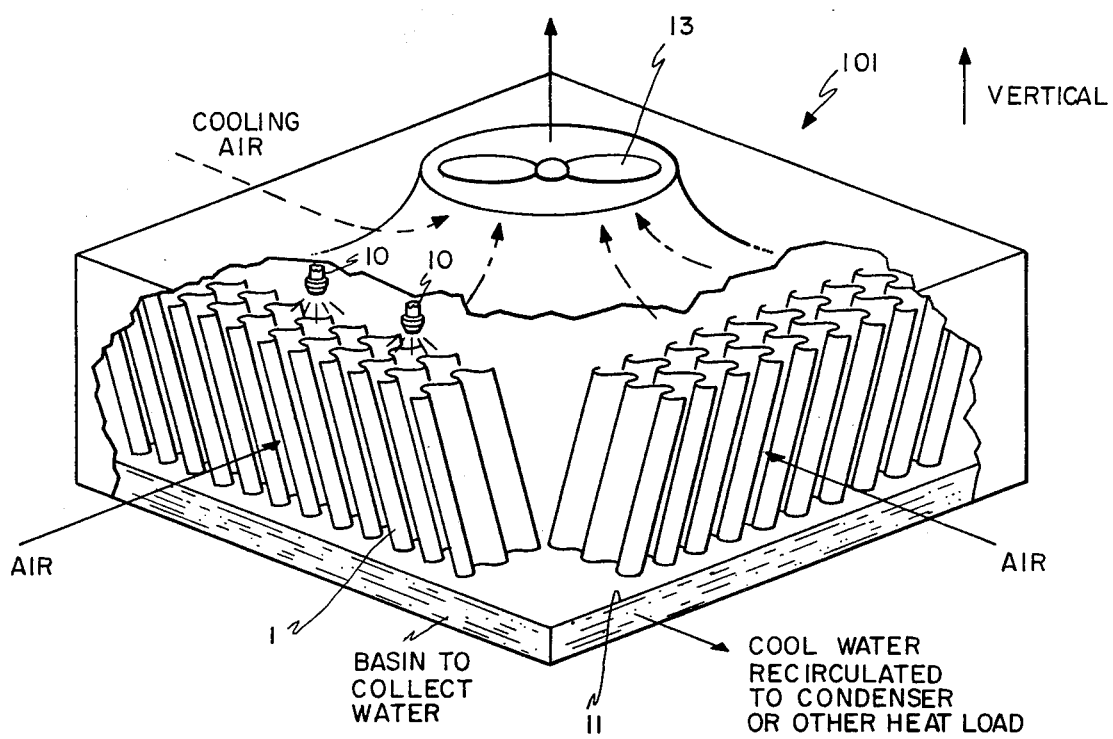
FIG. 3
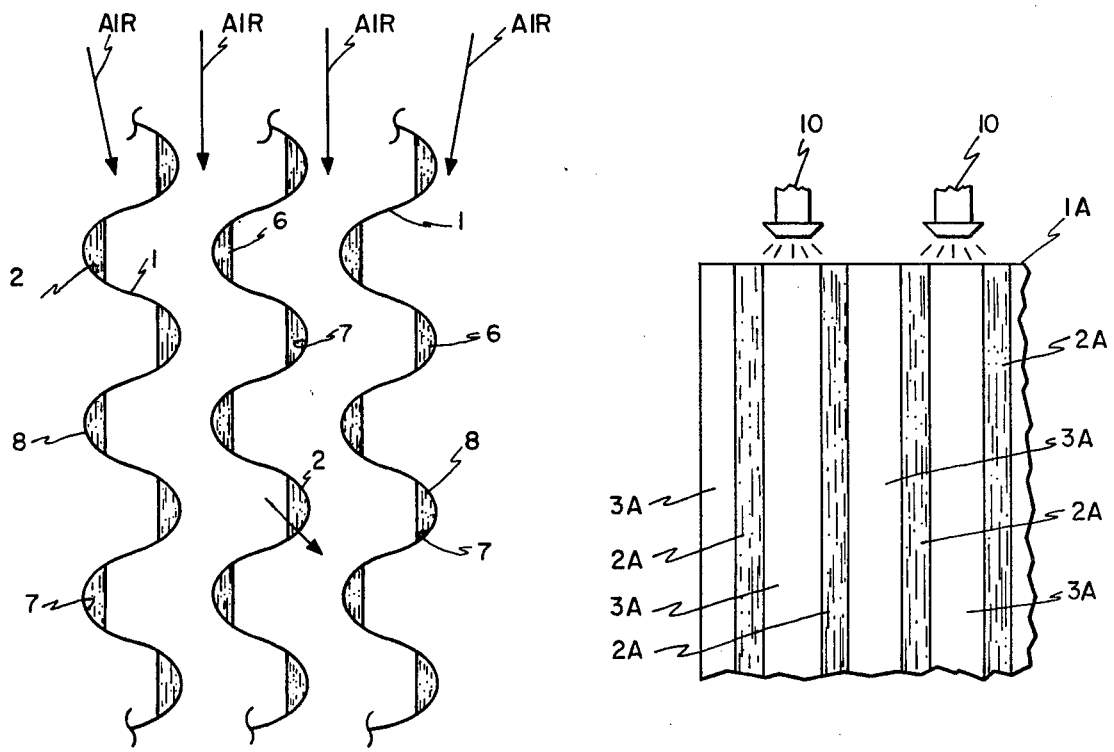
FIG. 5
FIG. 6

WET/DRY COOLING TOWER AND METHOD

Some aspects of the present invention were developed under contract number E(11-1)-2500 with the Energy Research and Development Administration, an agency of the U.S. Government.

The present invention relates to cooling towers of particular use in cooling large amounts of water.

The increasing use of water as a cooling medium in connection with air conditioning, industrial processes, generation of electricity and the like, coupled with the need to conserve and recycle the cooling water has led to the development of so-called dry cooling towers wherein non-evaporative cooling takes place. As compared to wet cooling towers which employ evaporative cooling, the dry cooling tower has a high initial cost and reduced cooling capability, particularly during periods of high ambient temperatures. Yet many areas of the world cannot tolerate the water loss occasioned by evaporative cooling. In addition, in certain climates wet towers produce fog plumes and precipitation downwind of the tower.

Accordingly, it is an object of the present invention to provide a wet/dry cooling tower that embodies the relatively low cost permitted by wet cooling tower designs and yet has a much lower water loss than conventional wet towers.

Another object is to provide a wet/dry cooling tower that is far more economical to build and to maintain than a dry cooling tower, even in very large installations, and yet one that has cooling efficiencies that approach those of wet cooling towers.

Still another object is to provide a wet/dry cooling tower which can be used as a peaking unit with a conventional dry tower and has lower water consumption than a conventional wet tower used as a peaking unit with a dry tower.

These and still further objects are addressed hereinafter.

The foregoing objects are achieved in a cooling tower that includes, in combination, a hot liquid distribution system, a cooling air distribution system, and a heat transfer surface comprising peaks and valleys which serves to transfer heat from the hot liquid to the cooling air. The surface receives the liquid in the valleys which constitute wet areas in the surface; heat is transferred from the liquid to the surface at the wet areas conducted to dry areas of the surface. Most of the heat transfer from the surface to the cooling air occurs at said dry areas which typically constitute the order of 95 percent of the total exposed area.

The invention is hereinafter described with reference to the accompanying drawing in which:

FIG. 3 is an isometric view of a cooling tower that includes a plurality of heat transfer surfaces like those shown in FIG. 1;

FIG. 5 is a diagrammatic top view showing a plurality of vertically oriented corrugated heat transfer surfaces like the surface of FIG. 1; and FIG. 6 shows one heat transfer surface that is a modification of the heat transfer surfaces of FIG. 1.

The apparatus herein described and shown at 101 in FIG. 3 is referred to as a wet/dry cooling tower and is a hybrid between a more conventional dry cooling tower and a wet cooling tower. What the present inventors have discovered is that a cooling tower can be made which has attributes of both the conventional dry cooling tower and the conventional wet cooling tower: namely, the wet/dry cooling tower 101 permits cooling without substantial evaporation of the water yet it permits cooling performance approaching that of wet cooling towers, and the cost of building the wet/dry cooling tower 101 is calculated to be much less than the conventional dry cooling tower. Since there will be some evaporation in the wet/dry cooling tower 101, cooling to temperature below the dry bulb temperature is possible. Even so, the evaporation rate is far below that encountered in wet cooling towers, reducing water consumption and precluding the formation of visible fog plumes. Also, as later shown, both the rate of evaporation and the rate of cooling can be modified.

Figure 1:
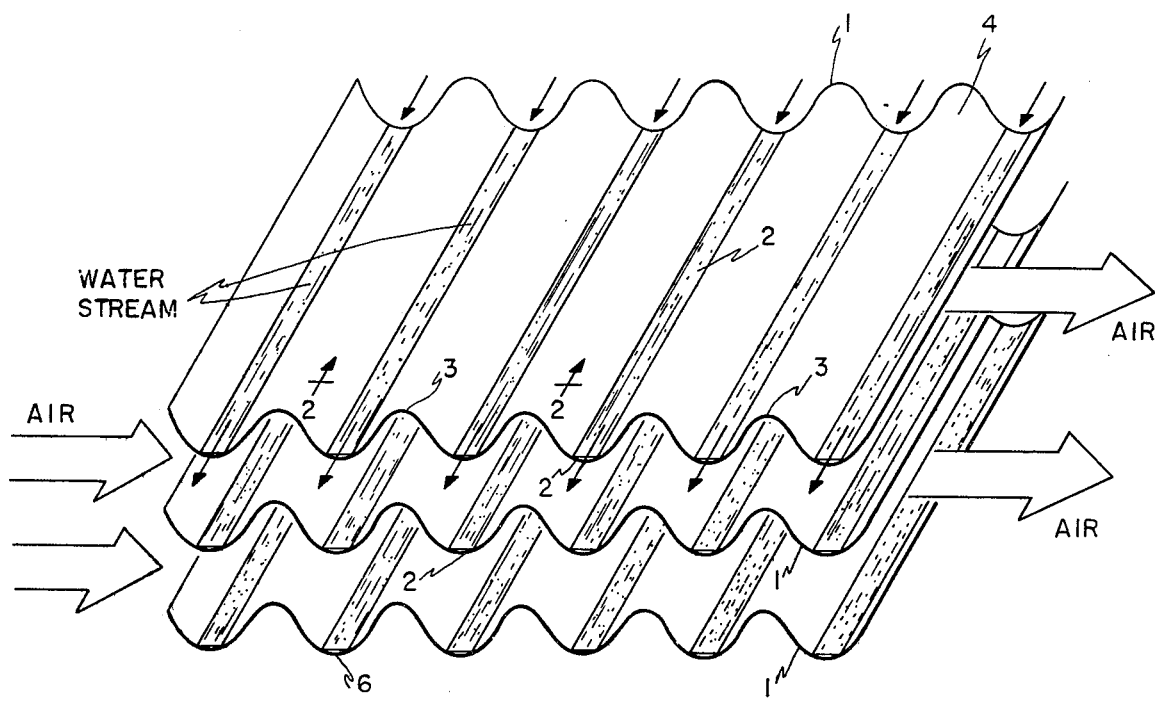
FIG. 1 is a diagrammatic isometric view of a portion of a wet/dry cooling tower of the present invention and shows three corrugated heat transfer surfaces.
Figure 2:
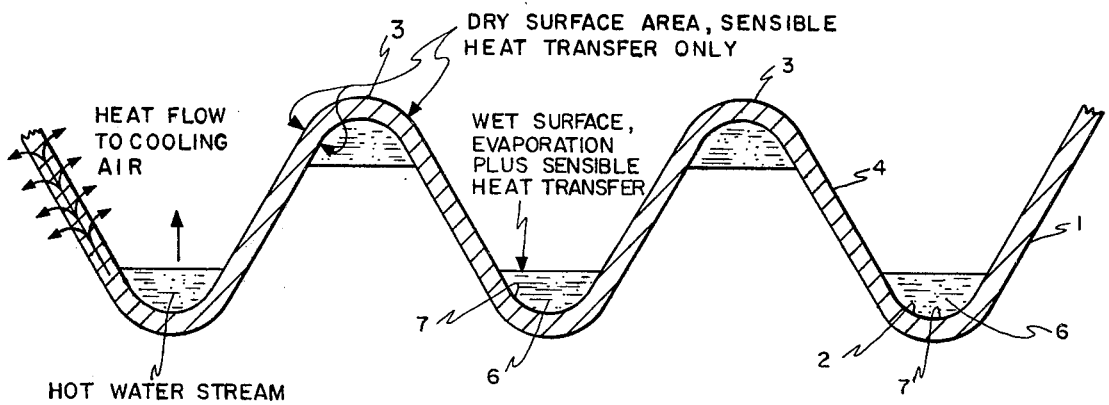
FIG. 2 is a section view of the upper of the three heat transfer surfaces, taken upon the line 2—2 in FIG. 1 and looking in the direction of the arrows.
Figure 4:
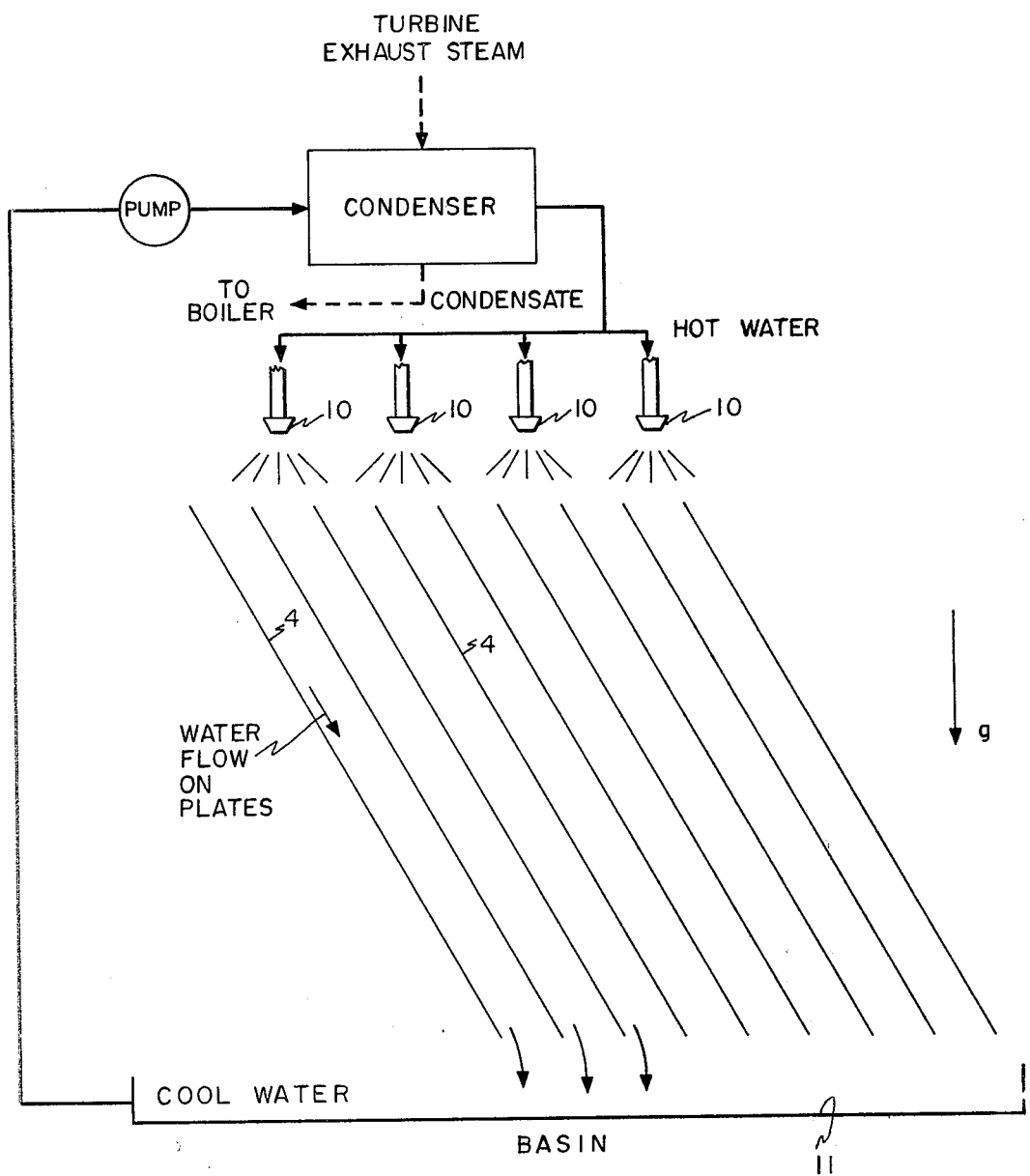
FIG. 4 is a diagrammatic side view of a part of a cooling tower like the tower of FIG. 3.

The cooling tower 101 comprises heat transfer means 1 which is shown in FIG. 1 as a plurality of corrugated heat transfer surfaces or sheets 1, each sheet 1, as best shown in FIGS. 1 and 2, comprising a plurality of longitudinally extending channels or grooves 2 and ridges 3 at the upper surface 4 thereof. Hot water 6 (or some other hot liquid) is delivered by a pump 5 in FIG. 4 to some liquid distribution system such as sprays 10 in FIGS. 3 and 4 which deliver the water onto the upper surface 4. The water 6 flows longitudinally in the direction of the arrow labeled A along the channels to the end thereof whence it is collected in a basin 11 and then delivered by the pumps 5 to serve as cold water for a condenser or other source of heat 12.

The amount of water delivered to the upper surface 4 is regulated so that it is sufficient to cover only a small fraction of the surface 4 and hence seeks the valleys or channels 2 and flows therealong, as indicated above. The portion of the surface 4 that are marked 7 and are in contact with the water 6 are called wet areas herein and the portions of the surface 4 that are marked 8 and are not in contact with the water 6 are called dry areas herein. The water is delivered at the upper end of the sheets 1 which are oriented at an angle of about 30° to the vertical so that the flow velocity in the channels 2 is quite high.

In the system 101, heat is transferred from the liquid 6 to the wet areas 7 of the sheet or plate 1 and then conducted through the sheet 1 (in the embodiment shown in FIG. 5 and later discussed, conduction is through the sheet 1 from one major surface thereof to the other major surface) to the dry areas 8 thereof. The sheet 1 may be made of galvanized steel or aluminimum, for example, but some plastics being developed may serve; it is necessary, however, that the material forming the sheet 1 have good heat transfer characteristics. Also, economic and other constraints dictate that the sheet 1 be thin, but it must be thick enough to provide relatively low resistance to lateral heat flow. In the embodiment of FIG. 5, the sheets 1 are oriented vertically; water is sprayed onto the sheets at the high end as before and flows downward across the sheets; however, in the embodiment of FIG. 5, the water is kept in the channels by surface tension and heat flow is from the wet areas 7, through the thickness of each sheet 1, to the dry areas thereof. The sheets 1 in FIG. 5 may be thin plastic.

A blower or fan 13 or other cooling air distribution system in FIG. 3 moves cooling air over the heat transfer surfaces 1 to effect cooling. The present inventors have found, and it serves as an underlying basis for the present invention, that cooling takes place mostly at the dry areas of the heat transfer surfaces; a smaller part of such cooling—and, hence, evaporation—occurs at the air-water interface.

It has been found by experimental measurement with a series of galvanized plates formed as shown in FIG. 1 that at high ambient temperature, e.g., 80° F., and with a 130° F. water temperature, more than fifty percent of the heat transfer is by sensible heat transfer and the remainder evaporation. The tests also agree closely with a computer performance prediction which indicates that at low ambient temperatures, as much as seventy five to eighty percent of the heat conduction is sensible and the balance evaporation.

In a computer study, comparing a wet/dry tower using the present design with a conventional wet tower over a year's operation for the same total heat rejection rate, the wet/dry tower only consumed thirty-seven percent as much water as the wet tower. The wet/dry tower surface area was only 72% of the surface area of a conventional dry tower; and the wet/dry tower required only one half the air flow rate of the dry tower for the same heat rejection rate at a 90° F. ambient design temperature.

A few further matters are taken up in this paragraph. Air flow across the sheets 1 can be co-flow, counter flow or transverse, etc. The above discussion is with reference to a tower wherein the water flows in channels or the like of an uneven surface, but such channeling can be effected by using, say, longitudinal nonwetting, parallel-disposed strips 3A of teflon or a like material as shown in FIG. 6, whereby the channels labeled 2A are the regions of the heat transfer surface or sheet labeled 1A, that lie between the strips 3A.

Modifications of the invention herein described (e.g., the sheets 1 may be dimpled or have some other uneven surface) will occur to persons skilled in the art and all such modifications are deemed to be within the spirit and scope of the invention as defined by the appended claims.

What is claimed is:

1. A method of cooling hot water which comprises:
    (a) providing a flow of hot water in spaced wetted areas across the surface of an element having high heat transmission characteristics so as to leave non-wetted dry areas intermediate wetted areas in such a manner that the intermediate dry areas are larger than the wetted areas,
    (b) permitting the heat of the wetted areas from hot water to be transmitted through the element to the dry areas,
    (c) providing a flow of cooling air on said element in contact with said wet and dry areas to thus extract most of the total heat of the hot water by cooling of said dry areas without dependence on evaporation and a lesser amount of cooling by evaporation from said wetted areas.

2. A cooling tower system for cooling hot water comprising, in combination, a source of hot water to be cooled, a highly heat conductive heat transfer element having a surface disposed to receive hot water from said source thereon and being provided with a plurality of discrete spaced open channels arranged to flow substantially all said hot water on spaced areas wetted thereby leaving larger substantially dry areas intermediate said wetted areas wherein the heat of said hot water is distributed by conduction throughout said element from said wetted areas to said dry areas;

a source of cooling air disposed to move air across the surface of said element primarily cooling the dry areas by extraction of heat therefrom transmitted thereto from said wetted areas whereby the greater portion of total heat of said hot water is thus removed via said dry areas by air flow contact therewith without dependence on evaporation and a lesser portion of total heat removed by evaporation effected by the flow of cooling air in contact with said wetted areas.

3. A cooling tower system as set forth in claim 2, in which the heat transfer element is a corrugated sheet.

4. A cooling tower system as set forth in claim 3, in which the corrugated sheet comprises a plurality of grooves effecting hot water channels.

5. A cooling tower system as set forth in claim 3, wherein the sheet is comprised of metal.

6. A cooling tower system as set forth in claim 2, having a cooling air distribution system operable to effect air flow in a direction substantially opposite to the direction of hot water flow.

7. A cooling tower system as set forth in claim 2, having an air flow distribution system wherein the air flow is disposed at an angle to the direction of hot water flow.

8. A cooling tower system as set forth in claim 2, in which the element is a corrugated metal sheet having the dry areas roughened to increase heat dissipation therefrom.

9. A cooling tower system as set forth in claim 2, wherein the dry areas comprise strips of material spaced from each other and secured to said element and having a substantially non-wettable characteristic.

10. A cooling tower system as set forth in claim 2, wherein the heat transfer element comprises a corrugated sheet disposed substantially vertically and means for hot water to be directed thereto and to flow in the valleys of said corrugations and being held in said valleys by surface tension.

11. A cooling tower system as set forth in claim 10, wherein said corrugated sheets are provided in parallel plurality and means whereby hot water is directed to the upper ends of said sheets and means whereby cooling air is directed to both sides of said sheets.

* * * * *